US012773977B2

(12) United States Patent
Lee

(10) Patent No.: US 12,773,977 B2
(45) Date of Patent: Oct. 27, 2026

(54) SUSPENSION CONTROL MODULE AND METHOD FOR INDEPENDENTLY DRIVABLE AND STEERABLE WHEELS

(71) Applicant: HL MANDO CORPORATION, Gyeonggi-do (KR)

(72) Inventor: Kyungtack Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 21 days.

(21) Appl. No.: 18/963,647

(22) Filed: Nov. 28, 2024

(65) Prior Publication Data

US 2025/0178583 A1 Jun. 5, 2025

(30) Foreign Application Priority Data

Dec. 1, 2023 (KR) ........................ 10-2023-0172555

(51) Int. Cl.

| | |
|---|---|
| ***B60W 10/22*** | (2006.01) |
| ***B60G 17/0165*** | (2006.01) |
| ***B60W 30/182*** | (2020.01) |
| ***G06V 20/56*** | (2022.01) |

(52) U.S. Cl.

CPC ......... *B60W 10/22* (2013.01); *B60G 17/0165* (2013.01); *B60W 30/182* (2013.01); *G06V 20/588* (2022.01); *B60W 2420/403* (2013.01); *B60W 2520/28* (2013.01); *B60W 2540/18* (2013.01); *B60W 2552/05* (2020.02)

(58) Field of Classification Search

CPC .............. G06V 20/588; B60G 17/0163; B60G 17/0165; B60G 17/018; B60G 17/0195; B60G 2400/41; B60G 2400/82; B60G 2400/821; B60G 2400/824; B60G 2400/102; B60G 2400/208; B60G 2401/14; B60G 2800/963; B60Y 2400/84; B60W 10/22; B60W 30/182; B60W 2420/403; B60W 2520/18; B60W 2520/28; B60W 2552/05

See application file for complete search history.

(56) References Cited

U.S. PATENT DOCUMENTS 3,255,840 A * 6/1966 Tangen ................ B60K 17/046 180/242
4,289,214 A * 9/1981 Spence ................ B62D 49/065 180/311
4,337,840 A * 7/1982 Bufler ................ B60K 17/3505 180/24.08
(Continued)

FOREIGN PATENT DOCUMENTS

CN 115157948 A * 10/2022 ............ B60W 10/20
CN 117141488 A * 12/2023 ............ B60W 30/18
(Continued)

*Primary Examiner* — John M Zaleskas
(74) *Attorney, Agent, or Firm* — WOMBLE BOND DICKINSON (US) LLP

(57) ABSTRACT

A suspension module for a vehicle configured to be independently drivable and steerable of each of four wheels and a control method thereof may improve ride quality in various driving modes of the vehicle, such as oblique driving, crab driving, rotating driving, and the like, by controlling a suspension of a following wheel having an overlapped movement line using information on a road surface identified by a preceding wheel.

16 Claims, 4 Drawing Sheets

(56) References Cited

U.S. PATENT DOCUMENTS

| | | | | | |
|---|---|---|---|---|---|
| 4,592,439 | A * | 6/1986 | Collard | B60K 17/356 180/41 |
| 4,690,429 | A * | 9/1987 | Asami | B60G 21/0556 280/5.517 |
| 4,828,283 | A * | 5/1989 | Ishii | B60G 17/0523 280/5.521 |
| 5,032,997 | A * | 7/1991 | Kawagoe | B60K 23/0808 180/404 |
| 5,204,815 | A * | 4/1993 | Yamamoto | B60G 17/0195 280/5.506 |
| 2004/0129491 | A1* | 7/2004 | Bean | B60B 35/003 180/21 |
| 2005/0217906 | A1* | 10/2005 | Spark | B62D 9/00 180/22 |
| 2010/0204888 | A1* | 8/2010 | Nishioka | B60G 7/003 701/41 |
| 2015/0028550 | A1* | 1/2015 | Gano | B60G 3/02 280/5.514 |
| 2015/0120145 | A1* | 4/2015 | Han | B62D 7/148 701/43 |
| 2019/0168806 | A1* | 6/2019 | Liu | B62D 15/021 |
| 2023/0037740 | A1* | 2/2023 | Ha | B60W 10/20 |
| 2023/0123508 | A1* | 4/2023 | Kim | B60W 40/06 701/1 |
| 2024/0001924 | A1* | 1/2024 | Giovanardi | B60W 30/04 |
| 2024/0140399 | A1* | 5/2024 | Noma | B60W 30/045 |
| 2025/0074389 | A1* | 3/2025 | Kim | B60K 7/0007 |
| 2025/0178396 | A1* | 6/2025 | Lee | B60G 17/0195 |

FOREIGN PATENT DOCUMENTS

| | | | | |
|---|---|---|---|---|
| DE | 102017211949 | A1 * | 1/2019 | B60G 17/0163 |
| JP | 2003095122 | A * | 4/2003 | |
| JP | 2006347197 | A * | 12/2006 | |
| JP | 2020131738 | A * | 8/2020 | |
| KR | 20050029507 | A * | 3/2005 | |
| KR | 20220046336 | A * | 4/2022 | B60G 17/018 |
| KR | 20220087650 | A * | 6/2022 | B60G 17/018 |

* cited by examiner

FIG. 1
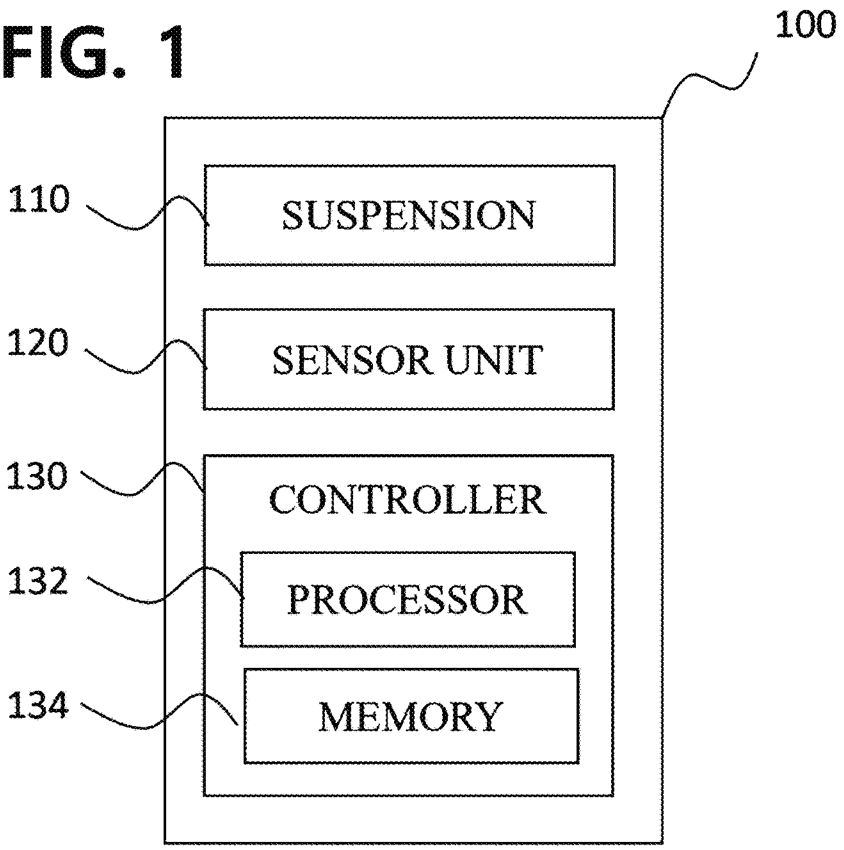
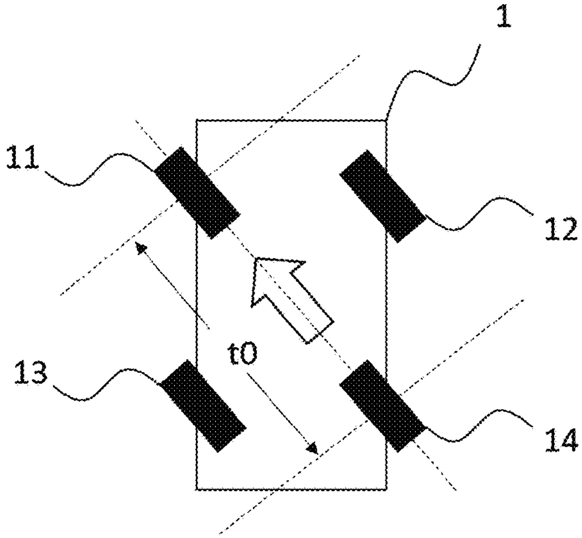
FIG. 2A
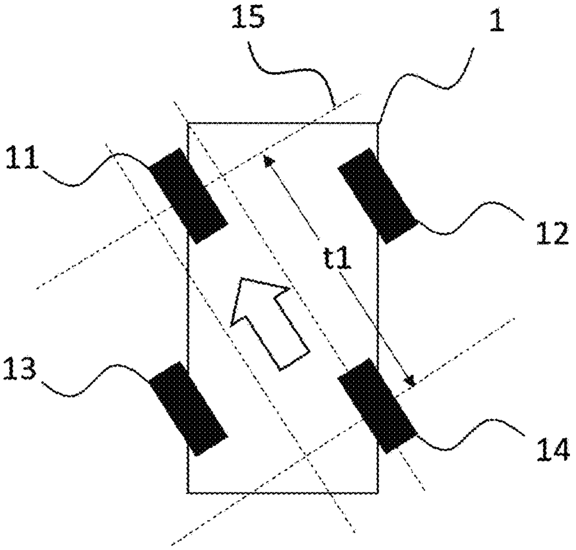
FIG. 2B

SUSPENSION CONTROL MODULE AND METHOD FOR INDEPENDENTLY DRIVABLE AND STEERABLE WHEELS

CROSS-REFERENCE TO RELATED APPLICATION

This application claims priority to and the benefit from Korean Patent Application No. 10-2023-0172555, filed on Dec. 1, 2023, the disclosure of which is incorporated herein by reference in its entirety.

BACKGROUND

1. Technical Field

The present disclosure generally relates to suspension control of a vehicle, and particularly to a suspension control of a vehicle having a plurality of wheels configured to be independently drivable and steerable.

2. Discussion of Related Art

Suspensions connecting a vehicle body and wheels are devices configured to absorb road shock and secure tire traction. The suspension can absorb shock generated while the vehicle is traveling on a road before the shock is transmitted to a vehicle body or an occupant, thereby reducing fatigue of the vehicle body to increase durability and preserving ride quality of the occupant.

In recent years, attempts to make chassis parts regarding driving, steering, and braking, including the suspension into a single part have been made. That is, since each wheel is able to be independently driven and steered, instead of being connected by an axle, movements of vehicles having those chassis parts are different from those of conventional vehicles.

FIGS. 6A to 6F show examples of various steering modes for a vehicle capable of four-wheel independent driving and steering.

FIG. 6A shows forward wheel steering and FIG. 6B shows rear wheel steering.

FIG. 6C shows four-wheel steering in which front and rear wheels are steered in opposite directions, and FIG. 6D shows oblique steering in which the front and rear wheels are steered in the same direction.

FIG. 6E shows crab steering in which a vehicle moves completely sideways, and FIG. 6F shows pivot steering capable of rotating in place.

Vehicles in which general steering is performed follow an Euler angle using a state follower to maintain the Euler angle and perform feedback control for errors when a difference between the followed angle and an actual angle increases.

However, when a vehicle travels on a rough road surface such as off-road, state following may be difficult, and when various steering operations are performed as shown in FIGS. 6A to 6E, it may be difficult to identify the state of the road surface in advance through a camera and set the suspension.

Some embodiments of the present disclosure may resolve problems of suspension control methods in the conventional steering. Certain embodiments of the present disclosure may provide a suspension device and a control method capable of performing preview control even without using a camera in a state of a rough road surface such as an off-road driving environment.

SUMMARY

Some embodiments of the present disclosure provides a suspension and a control method applicable to various driving modes in a vehicle having a plurality of wheels configured to be independently drivable and steerable.

Certain embodiments of the present disclosure may stabilize a roll and a pitch of a vehicle by predicting a state of road surface based on a vehicle state even in an environment where a state is difficult to follow like off-road and adjusting the damping, force, and ride height of a suspension.

Meanwhile, other objects not mentioned in the present invention will be additionally considered within the scope to be easily inferred from the following detailed description and effects thereof.

According to an aspect of the present disclosure, there is provided a suspension module for a vehicle, including a plurality of suspensions connected to respective wheels of the vehicle, a sensor unit configured to identify a state of the vehicle or a state of a road surface, and a controller including one or more processors and a memory to control the plurality of suspensions, in which the controller identifies information on the road surface over which a preceding wheel passes for wheels having an overlapped movement line among the wheels of the vehicle by the sensor unit and controls a suspension connected to a following wheel using the information.

The vehicle may be a vehicle in which each of the plurality of wheels is independently driven and steered.

The sensor unit may include a wheel vertical acceleration sensor or a wheel speed sensor.

The controller may control the suspension connected to the following wheel only when the state of the road surface identified by the sensor unit is an off-road state.

The controller may calculate the movement line of each wheel of the vehicle in advance based on a steering angle and a speed of each wheel of the vehicle identified by the sensor unit.

The controller may control the suspension connected to the following wheel using information on the preceding wheel when the vehicle moves in oblique driving, crab driving, or rotating driving.

The controller may control the suspension connected to a right front wheel or a left rear wheel using information on a left front wheel and control the suspension connected to a right rear wheel using information on the right front wheel or the left rear wheel when the vehicle travels obliquely to the left front.

The controller may control the suspension connected to a right front wheel using information on a left front wheel and control the suspension connected to a right rear wheel using information on a left rear wheel when the vehicle travels left in the crab driving, and control the suspension connected to the left front wheel using information on the right front wheel and control the suspension connected to the left rear wheel using information on the right rear wheel when the vehicle travels right in the crab driving.

The controller may control the suspension connected to an n+1-th wheel using information on an n-th wheel based on a rotating direction when the vehicle rotates in place.

The controller may calculate a time it takes for the n+1-th wheel to reach a position of the n-th wheel using a wheel speed sensor.

According to another aspect of the present disclosure, there is provided a suspension control method including identifying information on a road surface over which a preceding wheel of a vehicle passes by a sensor unit and controlling a suspension connected to a following wheel having a movement line that overlaps with the preceding wheel using the identified information on the road surface.

The vehicle may be a vehicle in which each of the plurality of wheels is independently driven and steered.

The sensor unit may include a wheel vertical acceleration sensor or a wheel speed sensor.

The controlling of the suspension connected to the following wheel may be performed only when a state of the road surface identified by the sensor unit is an off-road state.

In the controlling of the suspension connected to the following wheel, a following wheel having a movement line that overlaps with the preceding wheel may be identified by calculating the movement line of each wheel of the vehicle in advance based on a steering angle and a speed of each wheel of the vehicle identified by the sensor unit.

The controlling of the suspension connected to the following wheel may be performed when the vehicle moves in oblique driving, crab driving, or rotating driving.

In the controlling of the suspension connected to the following wheel, the suspension connected to a right front wheel or a left rear wheel may be controlled using information on a left front wheel, and the suspension connected to a right rear wheel may be controlled using information on the right front wheel or the left rear wheel when the vehicle travels obliquely to the left front.

In the controlling of the suspension connected to the following wheel, the suspension connected to a right front wheel is controlled using information on a left front wheel and the suspension connected to a right rear wheel is controlled using information on a left rear wheel when the vehicle travels left in the crab driving, and the suspension connected to the left front wheel may be controlled using information on the right front wheel and the suspension connected to the left rear wheel may be controlled using information on the right rear wheel when the vehicle travels right in the crab driving.

In the controlling of the suspension connected to the following wheel, the suspension connected to an n+1-th wheel may be controlled using information on an n-th wheel based on a rotating direction when the vehicle rotates in place.

The controller may calculate a time it takes for the n+1-th wheel to reach a position of the n-th wheel using a wheel speed sensor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a schematic block diagram of a suspension module according to an exemplary embodiment of the present disclosure;

FIGS. 2A and 2B show examples of driving paths of wheels in an oblique driving mode of a vehicle according to an embodiment of the present disclosure;

Figure 3:
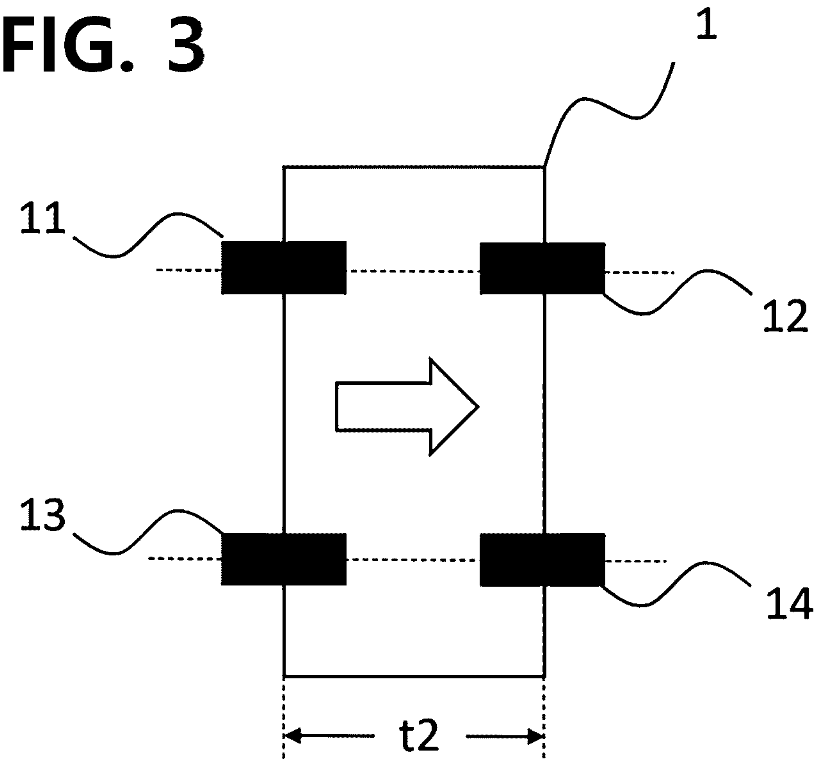
FIG. 3 shows an example of driving paths of wheels in a crab driving mode of a vehicle according to an embodiment of the present disclosure.

It is clarified that the attached drawings are illustrated as a reference for understanding the technical concept of the present invention, and the scope of the present invention is not limited by the drawings.

DETAILED DESCRIPTION OF EXEMPLARY EMBODIMENTS

The objects and means of the present invention and advantages according thereto will be more obvious from the following detail descriptions with reference to the accompanying drawings, and accordingly, the technical concept of the present invention may be easily practiced by those skilled in the art to which the present invention pertains. In describing the present invention, when it is determined that the detailed description of the known technology related to the present invention may unnecessarily obscure the subject matter of the present invention, the detailed description thereof will be omitted.

The terms used in the present specification are for the purpose of describing the embodiments only and are not intended to limit the invention. In the present specification, the singular forms "a," "an," and "the" are intended to include the plural forms as well as appropriate, unless the context clearly indicates otherwise. In this specification, terms such as "comprise," "include," "provide," or "have" do not exclude the presence or addition of one or more other components other than mentioned components.

In the present specification, terms such as "or" and "at least one" may represent one of words listed together, or a combination of two or more. For example, "A or B" and "at least one of A and B" may include only A or B, or include both A and B.

In the present specification, the description following "for example" may not exactly match the information presented, such as the recited characteristics, variables or values, and the exemplary embodiments of the invention according to various examples of the present invention should not be limited to effects such as variations including tolerances, measurement errors, limitations of measurement accuracy and other commonly known factors.

In the present specification, it will be understood that when an element is described as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present.

In the present specification, it will be understood that when an element is described as being "on" or "adjacent to" another element, the element may be directly in contact with or connected to another component, or still another component may exist therebetween. In contrast, it may be understood that when an element is described as being "directly above" or "directly adjacent to" another component, still another component does not exist therebetween. Other expressions describing the relationship between elements, such as "between" and "directly between," may be interpreted in the same manner.

In the present specification, it will be understood that, although the terms "first," "second," etc. may be used to describe various elements, these elements should not be limited by these terms. In addition, the above terms should not be interpreted as limiting the order of each component, and may be used for the purpose of distinguishing one element from another element. For example, a "first element" may be named a "second element," and similarly, a "second element" may also be named a "first element."

Unless otherwise defined, all terms used in the present specification may be used as the same meaning as commonly understood by one of ordinary skill in the art to which the present invention pertains. In addition, it will be further understood that terms, such as those defined in commonly used dictionaries, will not be interpreted in an idealized or overly formal sense unless expressly so defined herein.

Hereinafter, exemplary embodiments of the present disclosure according to the present disclosure will be described in detail with reference to the accompanying drawings.

FIG. 1 is a schematic block diagram of a suspension module according to an exemplary embodiment of the present disclosure.

A suspension module 100 according to an embodiment of the present disclosure may include suspensions 110, a sensor unit 120, and a controller 130.

Each of the suspensions 110 connects a wheel of a vehicle to a vehicle body and may configured to absorb short from a road surface, thereby improving ride quality of vehicle occupants and reducing fatigue of the vehicle body.

The suspension 110 is configured to adjust the damping, force, and ride height of the suspension 110 depending on a state of a road surface (e.g., paved road, dirt road, sand road, gravel road, or the like) and the presence of obstacles (e.g. bumps, steps, sinkholes, or the like) in order to provide optimal ride quality according to each situation.

The sensor unit 120 may be configured to monitor operations and driving status of the vehicle and surrounding environment of the vehicle. The sensor unit 120 may be used to identify the state of the road surface or the presence of obstacles in order to control the suspension 110.

The sensor unit 120 may include, for example, but not limited to, a camera configured to acquire image data of the front, rear, or side of the vehicle, an acceleration sensor configured to sense or measure the vertical acceleration of the wheel or vehicle body to identify the state of the road surface, and a wheel speed sensor configured to sense the speed of the wheel. Alternatively, the suspension module 100 may not need to include one or more sensors of the sensor unit 120. For example, the suspension module 100 can use a signal or data generated by a wheel speed sensor included in other systems of the vehicle, for instance, a driving assistance system such as an advanced driving assistance system (ADAS) or a body control system such as ABS/TCS instead of having the wheel speed sensor in the suspension module 100.

The controller 130 includes one or more processors 132 and a memory 134. The controller 130 may be configured to identify the state of the road surface based on signal or data of the sensor unit 120 and control the suspension 110 connected to one or more of the wheels of the vehicle according to the state of the road surface.

The memory 134 stores various information related to the operation of the suspension module 100. For instance, the information stored in the memory may include various sensor values measured through the sensor unit 120, information for control operation of the controller 130, information on signals processed or analyzed in the controller 130, program information regarding a control method, and the like, but is not limited thereto.

For example, the memory 134 may include a hard disk type, a magnetic media type, a compact disc read only memory (CD-ROM) type, an optical media type, a magneto-optical media type, a multimedia card micro type, a flash memory type, a read only memory type, a random-access memory type, or the like, but is not limited thereto. In addition, the memory 134 may comprise a cache, a buffer, a main memory, an auxiliary memory, or a separately provided storage system, but is not limited thereto.

The controller 130 may be configured to control the suspension module 100. The controller 130 may perform various control operations of the suspension module 100. That is, the controller 130 may control signal processing and analysis of a wheel speed value received from the sensor unit 120, and may identify the state of the road surface through the signal processing and analysis of sensor data such as an acceleration value of the wheel or vehicle body. Furthermore, the controller 130 may perform control on the suspension 110, which will be described below. For example, the controller 130 may include a hardware processor 132, a software executed by the processor, or combination thereof, but is not limited thereto.

The controller 130 identifies the state of the road surface on which a preceding wheel of the vehicle passes according to the movement direction and driving mode of the vehicle through the sensor unit 120, and stores the state of the road surface in the memory 134.

Then, when a following wheel of the vehicle reaches a point where the preceding wheel has passed, the damping, force, and ride height of the suspension 110 connected to the following wheel are controlled according to information on the state of the road surface stored in the memory 134.

When the vehicle moves forward, the suspension module 100 may control an operation of the suspension 110 associated with the rear wheel using the information on the state of the road surface identified by the front wheel. For example, information on the state of the road surface in front of the front wheel can be acquired using a camera or the like in advance and the suspension module 100 can control the operation of the suspension 110 for both the front wheel and the rear wheel based on the information of the state of the road surface acquired using the camera.

The suspension module 100 according to an embodiment of the present disclosure may be used for or applied to each of wheels of a vehicle in which each wheel is independently driven and steered.

The vehicle in which a plurality of wheels are independently driven and steered may be driven in various driving modes compared to vehicles of the related art. Therefore, if the vehicle uses only front and rear cameras or sensors, it may be difficult for conventional vehicles, capable of only moving forward or backward and turning left or right, to identify the state of the road surface.

The suspension module 100 an exemplary embodiment of according to the present disclosure may identify information on the road surface on which the preceding wheel passes through the sensor unit 120 and use the information for control associated with the following wheel even in a situation where it is difficult to use the cameras or sensors. For example, the suspension module 100 may calculate a vertical acceleration of the preceding wheel or a speed difference between the wheels using a vertical acceleration sensor or a wheel speed sensor included in the sensor unit 120, and identify the state of the road surface using the vertical acceleration and the speed difference of the preceding wheel.

The controller 130 may control the suspension 110 connected to the following wheel according to the state of the road surface identified by the preceding wheel when the state of the road surface identified by the sensor unit 120 is an off-road state such as an unpaved road or a gravel road.

Alternatively, the controller 130 may control the suspension 110 when the driving mode of the vehicle is an oblique driving mode, a crab driving mode, or a rotating driving mode. The aforementioned driving modes may be implemented in only vehicles in which a plurality of wheels are independently driven and steered, and in such a case, since a direction in which the vehicle faces or is placed and a direction in which the vehicle moves are different, the road surface may not be accurately identified by sensors such as cameras, as in the related art.

FIGS. 2A and 2B show an example of a relationship between the vehicle and wheels when the vehicle is moving in an oblique driving mode according to an embodiment of the present disclosure.

FIG. 2A shows an example where the vehicle 1 is traveling obliquely in a left front direction, and a path of a left front wheel 11 and a path of a right rear wheel 14 match.

When the path of the left front wheel 11 and the path of the right rear wheel 14 are substantially identical to each other, the controller 130 identifies the state of the road surface at a position where the left front wheel 11 passes by the sensor unit 120 and stores the state of the road surface in the memory 134.

Then, after time to has passed, when the right rear wheel 14 reaches the position where the left front wheel 11 passed, the controller 130 controls the suspension 110 connected to the right rear wheel 14 according to the state of the road surface stored in the memory 134 when the left front wheel 11 passed.

For performing this operation, the controller 130 may measure steering angles and wheel speeds of the wheels by the sensor unit 120 and calculates a path for each wheel, a time point in which each wheel reaches a specific position, and the like, in advance.

FIG. 2B shows an example where the vehicle 1 is traveling obliquely in a left front direction, and the path of the left front wheel 11 and the path of the right rear wheel 14 are different from each other.

When the pre-calculated paths of each wheel do not match each other, the controller 130 may not control the suspension 110 according to the operation described with reference to FIG. 2A.

However, in FIG. 2B, when an area of the path of the left front wheel 11 is expanded to partially overlap with the path of another wheel, for example, the right rear wheel 14, the controller 130 may control the suspension 110 according to another exemplary embodiment of the present disclosure.

In this case, when the path of the left front wheel 11 and the path of the right rear wheel 14 do not match, since the right rear wheel 14 will not exactly reach the position where the left front wheel 11 passed, the controller 130 may calculate time in which the right rear wheel 14 reaches the same line 15 where the left front wheel 11 was passed, for example, time t1, and control the suspension 110 connected to the right rear wheel 14 at a time point in which the right rear wheel 14 reaches the same line 15 where the left front wheel 11 was passed.

Alternatively, even when there is no overlapped region, the controller 130 may use a method of sequentially controlling the suspensions 110 connected to the wheels reaching the same line 15.

For example, when the vehicle is traveling obliquely to in a left front direction as shown in FIG. 2B, the left front wheel 11 may reach a line 15 first, then the right front wheel 12 and the left rear wheel 13 may reach the line 15 in that order, and lastly, the right rear wheel 14 may reach the line 15.

Therefore, the controller 130 may identify and store the state of the road surface at a position where the left front wheel 11 passes a line 15 and then control the suspension 110 connected to the right front wheel 12 when the right front wheel 12 reaches the same line 15, control the suspension 110 connected to the left rear wheel 13 when the left rear wheel 13 reaches the same line 15, and control the suspension 110 connected to the right rear wheel 14 when the right rear wheel 14 finally reaches the same line 15.

Alternatively, it may be possible to control the suspension 110 of the following wheel by identifying the information on the road surface at the position of the preceding wheel immediately in front in order. That is, the suspension 110 of the right front wheel 12 may be controlled by using information on the road surface acquired in association with the left front wheel 11, the suspension 110 of the left rear wheel 13 may be controlled by using information on the road surface acquired in association with the right front wheel 12, and finally, the suspension of the right rear wheel 14 may be controlled by using information on the road surface acquired in association with the left rear wheel 13. To this end, the controller 130 may obtain a time point in which each wheel reaches the same line 15 using the wheel speed value measured by the wheel speed sensor of each wheel.

FIG. 3 shows an example of a relationship between the vehicle and wheels when the vehicle is moving in a crab driving mode according to an exemplary embodiment of the present disclosure.

The crab driving mode may mean a driving mode in which a vehicle moves sideways like a crab. To this end, all of the wheels are steered in a direction perpendicular to a direction in which the vehicle 1 faces or is placed and driven. Then, when the vehicle 1 moves to the right in the crab driving mode as shown in FIG. 3, the paths of the right and left wheels of the vehicle 1 match.

Therefore, the controller 130 may identify the state of the road surface at the position where the right front wheel 12 passes or is placed and control the suspension 110 connected to the left front wheel 11 after time t2 has elapsed using information of the state of the road surface identified at the time the right front wheel 12 passed, and may identify the state of the road surface at the position where the right rear wheel 14 passes or is placed and control the suspension 110 connected to the left rear wheel 13 after time t2 has elapsed using information of the state of the road surface identified at the time the right rear wheel 13 passed.

In another example contrary to the example described in FIG. 3, when the vehicle 1 moves to the left in the crab driving mode, the controller 130 may identify the state of the road surface at the positions where the left wheels 11 and 13 pass are placed and control the suspensions connected to the right wheels 12 and 14 after a certain time has elapsed using information of the state of the road surface identified at the time the left wheels 11 and 13 passed.

Figure 4:
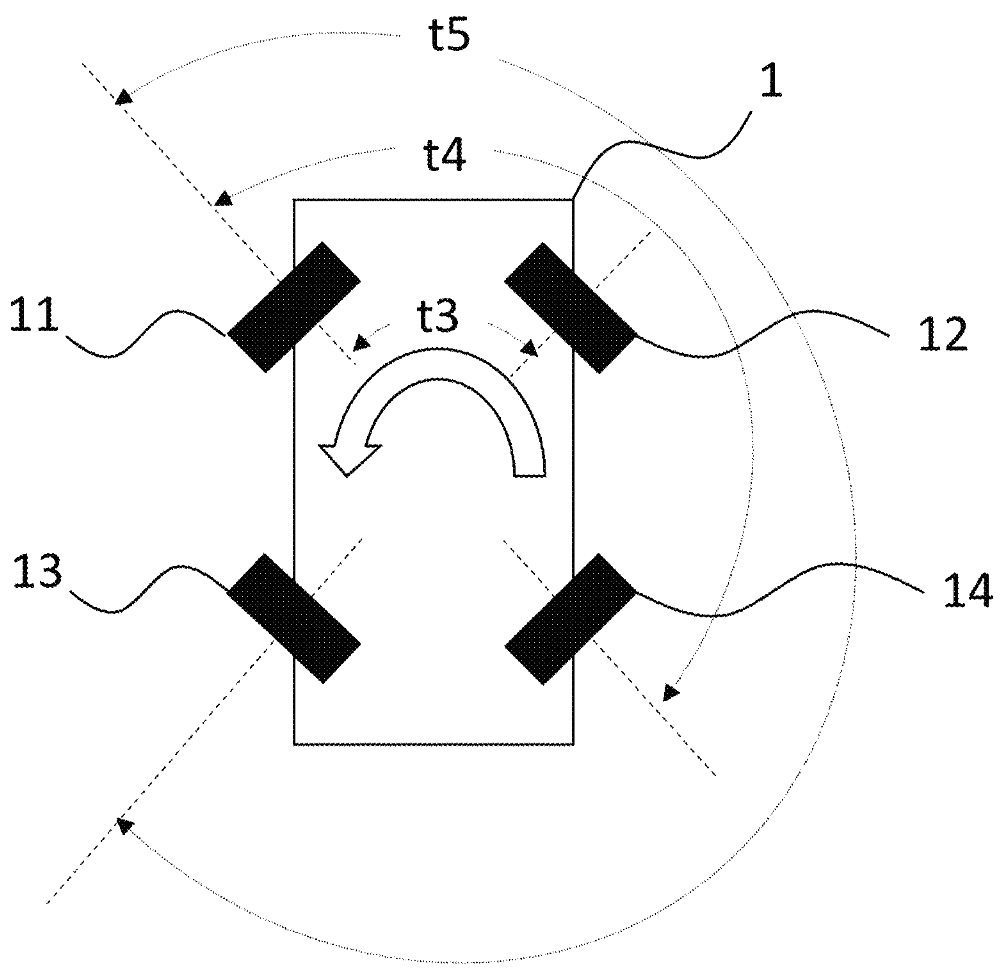
FIG. 4 shows an example of driving paths of wheels in a mode in which a vehicle rotates in place according to an embodiment of the present disclosure.

FIG. 4 shows an example of a relationship between the vehicle and wheels when the vehicle is moving in an in-place rotating driving mode according to an embodiment of the present disclosure.

When the vehicle is rotating in place, it may be difficult to identify the road surface in the direction of travel of the vehicle using a camera or the like. Therefore, control according to the road surface may be possible when the road surface on which the preceding wheel passes or is placed is identified by the sensor unit 120 and the suspensions 110 connected to the following wheels are controlled according to an exemplary embodiment of the present disclosure.

For example, when the vehicle 1 rotates counterclockwise in place as shown in FIG. 4, the right front wheel 12 will be located at a position where the left front wheel 11 passed after time t3 has elapsed, then the right rear wheel 14 will be located at the position where the left front wheel 11 passed after time t4 has elapsed, and lastly, the left rear wheel 13 will be located at the position where the left front wheel 11 passed after time t5 has elapsed, and then the left front wheel 11 is located again at its original position.

Therefore, the controller 130 may identify the state of the road surface at a position where an n-th wheel passes. The position where the n-th wheel passes may be set as a reference position. Then, the controller 130 controls the suspension 110 connected to an (n+1)-th wheel using the identified state of the road surface, identified at the position where the n-th wheel passed, when the (n+1)-th wheel reaches the position where the n-th wheel passed in a direction opposite to the rotating direction. For example, if the left front wheel 11 is set as a first wheel in the vehicle 1 in FIG. 4, the right front wheel 12 is a second wheel, the right rear wheel 14 is a third wheel, and the left rear wheel 13 is a fourth wheel.

Alternatively, when the vehicle is rotating in place, since the (n+1)-th, (n+2)-th, and (n+3)-th wheels all pass through a position where the n-th wheel passed over time, the controller 130 may control the suspension 110 connected to each of the (n+1)-th, (n+2)-th, and (n+3)-th wheels when the corresponding one of (n+1)-th, (n+2)-th, and (n+3)-th wheels passes through the position where the n-th wheel passed.

Alternatively, another embodiment of the present disclosure may identify and store information on the road surface at positions where each of the four wheels is located, and then perform suspension control for all four wheels when the following wheel arrives at a position where the preceding wheel passes. For example, the controller 130 may simultaneously identify the information on the road surface at positions where the n-th, (n+1)-th, (n+2)-th, and (n+3)-th wheels are located and control the suspension 110 of each wheel when the (n+1)-th wheel reaches the previous position where the n-th wheel passed, when the (n+2)-th wheel reaches the previous position where the (n+1)-th wheel passed, when the (n+3)-th wheel reaches the previous position where the (n+2)-th wheel passed, and lastly, when the n-th wheel reaches the position where the (n+3)-th wheel passed. At the same time, for next control of the suspension 110, the information on the road surface at the position where the n-th, (n+1)-th, (n+2)-th, and (n+3)-th wheels pass or are located may be updated.

To this end, the controller 130 may identify the speed of each wheel using the wheel speed sensor included in the sensor unit 120 and calculate time a next wheel reaches a position where a preceding wheel passed.

Figure 5:
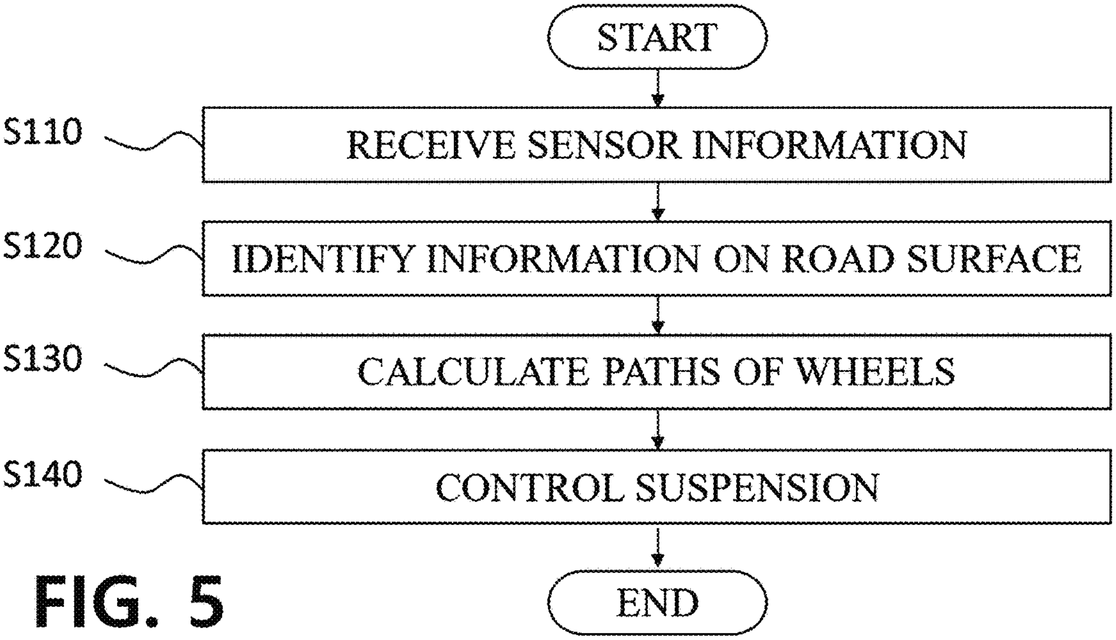
FIG. 5 RELATED ART
FIG. 5 is a schematic flowchart of a suspension control method according to an exemplary embodiment of the present disclosure.
Figure 6:
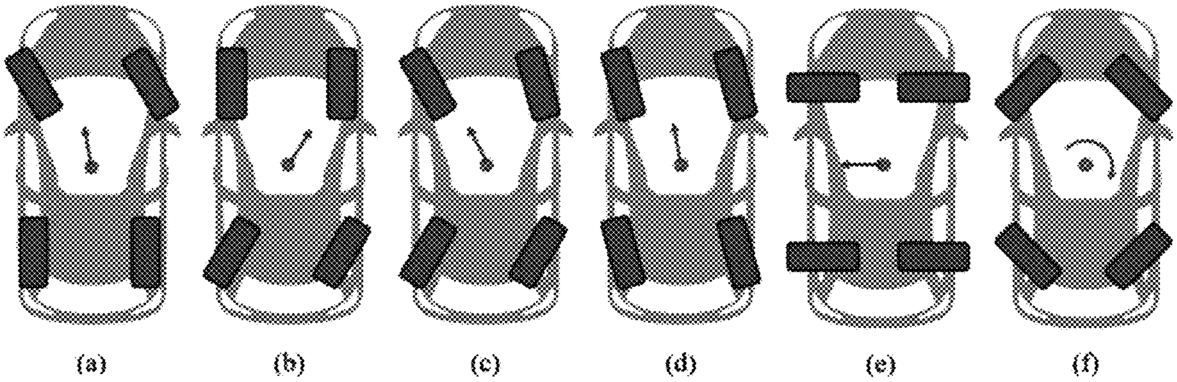
FIGS. 6A to 6F show various examples of driving modes of a vehicle having wheels configured to be independently drivable and steerable.

FIG. 5 is a flowchart of a method of controlling a suspension for a vehicle according to an exemplary embodiment of the present disclosure.

The suspension control method according to an exemplary embodiment of the present invention may be performed by a controller including one or more processors and a memory.

The controller receives sensor information from a sensor unit to identify information on a road surface (S110). The sensor unit may include one or more sensors, for example, but not limited to, an acceleration sensor configured to measure the vertical acceleration of a wheel or a wheel speed sensor configured to measure the speed of the wheel.

The controller then identifies a state of the road surface at a position where a preceding wheel passes or is located based on the sensor information received at operation S110 (S120).

After the state of the road surface is identified by the controller at operation S120, information of the identified state of the road surface is stored in the memory for controlling one or more following wheels.

After the state of the road surface is identified by the controller at operation S120, paths of following wheels are estimated or calculated to determine or identify whether the paths of the following wheels match or overlap with a path of a preceding wheel, and time in which the following wheels to reach a position of the preceding wheel is calculated (S130).

At operation S130, the estimation or calculation of the paths of the wheels may vary depending on the driving mode of the vehicle such as an oblique driving mode, crab driving mode, and in-place rotating driving mode, or any driving mode in which wheels are capable of being independently steered.

The paths of the wheels may be estimated or calculated based on a steering angle and a speed of each wheel received from the sensor unit at operation S110.

Then, when the following wheel reaches the position where the preceding wheel passed or was placed, the controller controls the suspension connected to the following wheel according to the previously identified information on the state of the road surface (S140).

The control method of a suspension for a vehicle may be accomplished in the same or similar way as the control method of the suspension module 100 for a vehicle discussed above.

Therefore, as described above, the control of the suspension connected to each wheel may be performed when the state of the road surface is an off-road state, or when the vehicle is moving in the oblique driving, crab driving, or in-place rotating driving.

According to some exemplary embodiments of the present disclosure, the suspension module 100 and the control method thereof may identify the state of a road surface on which a preceding wheel passes or is placed in advance and control the suspension connected to a following wheel, thereby providing a more comfortable ride quality even in an environment where the state of the road surface is not possible to be identified in advance by a camera or the like.

Further, certain exemplary embodiments of the present disclosure may provide a stable ride quality to a driver through road surface state following in an unstable driving environment such as off-road.

In addition, some exemplary embodiments of the present disclosure may stabilize an attitude of a vehicle by predicting information on a road surface through a state of the vehicle and controlling a suspension based on the predicted information.

Meanwhile, it is added that, even though not explicitly described herein, an effect described in the specification below that is expected by the technical feature of the present invention and a temporary effect thereof will be treated as those described in the specification of the present invention.

Although specific embodiments have been described in the detailed description of the present invention, various modifications can be made without departing from the scope of the present invention. Therefore, the scope of the present invention is not limited to the described embodiments, but should be defined by the claims described below and their equivalents.

What is claimed is:

1. A suspension module for a vehicle, comprising:

a plurality of suspensions operably connected to a plurality of wheels of the vehicle;

a sensor unit configured to sense a state of the vehicle and/or a state of a road surface; and a controller configured to identify information on the state of the road surface, on which a preceding wheel of the wheels having an movement line overlapped with a movement path of a following wheel of the wheels passes, and control one of the suspensions operably connected to the following wheel using the information on the state of the road surface on which the preceding wheel passes, wherein one or more of the plurality of wheels are configured to be independently drivable and steerable, and wherein the controller is configured to control the one of the suspensions operably connected to the following wheel using information on the preceding wheel when the vehicle moves in an oblique driving mode, a crab driving mode, or a rotating driving mode.

2. The suspension module of claim 1, wherein the sensor unit includes a wheel vertical acceleration sensor and/or a wheel speed sensor.

3. The suspension module of claim 1, wherein the controller is configured to control the one of the suspensions operably connected to the following wheel when the state of the road surface sensed by the sensor unit is identified as an off-road state.

4. The suspension module of claim 1, wherein the controller is configured to estimate movement paths of the wheels of the vehicle based on a steering angle and a speed of each of the wheels of the vehicle sensed by the sensor unit.

5. The suspension module of claim 1, wherein the controller is configured to, when the vehicle moves obliquely in a left front direction, control one of the suspensions operably connected to a right front wheel or a left rear wheel using information on a left front wheel and control another of the suspensions operably connected to a right rear wheel using information on the right front wheel or the left rear wheel.

6. The suspension module of claim 1, wherein the controller is configured to:

when the vehicle moves to left in the crab driving mode, control first one of the suspensions connected to a right front wheel using information on a left front wheel and control second one of the suspensions operably connected to a right rear wheel using information on a left rear wheel; and when the vehicle moves to right in the crab driving mode, control third one of the suspensions operably connected to the left front wheel using information on the right front wheel and control fourth one of the suspensions operably connected to the left rear wheel using information on the right rear wheel.

7. The suspension module of claim 1, wherein the controller is configured to, when the vehicle rotates in place, control one of the suspensions connected to an (n+1)-th wheel of the plurality of wheels using information on an n-th wheel of the plurality of wheels based on a rotating direction of the vehicle (n is a natural number).

8. The suspension module of claim 7, wherein the controller is configured to calculate a time in which the (n+1)-th wheel reaches a position on which the n-th wheel passes using a wheel speed.

9. A method of controlling a suspension module for a vehicle, the method comprising:

identifying information on a state of a road surface on which a preceding wheel of the vehicle passes using a sensor unit; and controlling a suspension operably connected to a following wheel having a movement path that overlaps with a movement line of the preceding wheel using the identified information on the state of the road surface on which the preceding wheel passes, wherein one or more of the plurality of wheels are configured to be independently drivable and steerable, and wherein the controlling of the suspension operably connected to the following wheel comprises controlling the one of the suspensions operably connected to the following wheel using information on the preceding wheel when the vehicle moves in an oblique driving mode, a crab driving mode, or a rotating driving mode.

10. The method of claim 9, wherein the sensor unit includes a wheel vertical acceleration sensor and/or a wheel speed sensor.

11. The method of claim 9, wherein the controlling of the suspension operably connected to the following wheel is performed when the state of the road surface sensed by the sensor unit is identified as an off-road state.

12. The method of claim 9, wherein the controlling of the suspension operably connected to the following wheel comprises estimating the movement path of the following wheel that overlaps with the movement line of the preceding wheel by calculating movement lines of a plurality of wheels of the vehicle based on a steering angle and a speed of each of the plurality of wheels of the vehicle sensed by the sensor unit.

13. The method of claim 9, wherein the controlling of the suspension operably connected to the following wheel comprises, when the vehicle moves obliquely in a left front direction, controlling a suspension connected to a right front wheel or a left rear wheel using information on a left front wheel and controlling a suspension connected to a right rear wheel using information on the right front wheel or the left rear wheel.

14. The method of claim 9, wherein the controlling of the suspension operably connected to the following wheel comprises:

when the vehicle moves to left in the crab driving mode, controlling a suspension connected to a right front wheel using information on a left front wheel and a suspension connected to a right rear wheel using information on a left rear wheel, and when the vehicle moves to right in the crab driving mode, controlling a suspension connected to the left front wheel using information on the right front wheel and a suspension connected to the left rear wheel using information on the right rear wheel.

15. The method of claim 9, wherein the controlling of the suspension operably connected to the following wheel comprises, when the vehicle rotates in place, controlling a suspension connected to an (n+1)-th wheel using information on an n-th wheel based on a rotating direction of the vehicle (n is a natural number).

16. The method of claim 15, further comprising calculating a time in which the (n+1)-th wheel reaches a position on which the n-th wheel passes using a wheel speed.

* * * * *